United States Patent [19]

Itagaki

[11] Patent Number: 4,684,286

[45] Date of Patent: Aug. 4, 1987

[54] STRUCTURE FOR COUPLING A BAR-LIKE MEMBER

[75] Inventor: Takafumi Itagaki, Urayasu, Japan

[73] Assignee: Tamatoshi Industries Limited, Tokyo, Japan

[21] Appl. No.: 776,046

[22] Filed: Sep. 13, 1985

[51] Int. Cl.⁴ ............................................. F16B 7/04
[52] U.S. Cl. ................................ 403/407.1; 403/372; 403/192; 52/508
[58] Field of Search .................... 403/407.1, 372, 11, 403/192, 194, 199, 299, 342; 52/508, 126.1, 126.3, 126.7, 365; 411/103, 107, 338, 339

[56] References Cited

U.S. PATENT DOCUMENTS

| | | | |
|---|---|---|---|
| 1,386,509 | 8/1921 | Kirmes et al. | 403/192 X |
| 2,526,791 | 10/1950 | Wroblewski | 403/407.1 |
| 2,890,072 | 6/1959 | Kaman et al. | 403/372 X |
| 3,222,096 | 12/1965 | Kaman | 403/372 |
| 3,527,486 | 9/1970 | Gamp | 403/11 |
| 3,606,410 | 9/1971 | Inserra | 403/11 X |
| 3,640,328 | 2/1972 | Tummarello | 411/103 |
| 4,169,308 | 10/1979 | Minogue | 403/407.1 |
| 4,238,987 | 12/1980 | Siebrect-Reuter | 52/508 X |

FOREIGN PATENT DOCUMENTS

1046282  12/1958  Fed. Rep. of Germany ... 403/407.1

Primary Examiner—Cornelius J. Husar
Assistant Examiner—Joseph A. Fischetti
Attorney, Agent, or Firm—Cushman, Darby & Cushman

[57] ABSTRACT

A structure for coupling a bar-like member to be erected on a floor or wall, with a coupling member having a connecting portion, and a holding member provided with a bearing hole to be engaged with the connecting portion, thereby allowing to detachably fix the coupling member on the floor or wall. The connecting portion of the coupling member is provided with threads or other fixing means. The holding member includes a base body to be fixed on the panel, a cylindrical main body erected perpendicularly from the base body, and a bearing hole formed in the main body and provided with threads or other fixing means to engage with the screw or other fixing means, thereby to fix the connecting portion therein.

5 Claims, 11 Drawing Figures

STRUCTURE FOR COUPLING A BAR-LIKE MEMBER

BACKGROUND OF THE INVENTION a. Field of the Invention

This invention relates to a structure for coupling a member having a connecting portion with a holding member to be fixed on a surface of wall, floor, glass plate and etc., wherein any member having a common connecting portion may be detachably coupled with a holding member which may be set in a desired place.

b. Descriptiion of the Prior Art

There is known various coupling structure for fixing a member having a connecting portion in a hole formed in a wall surface. For example, a structure wherein a connecting portion of a member is fixed by a magnetic force to a magnet mounted within a holding member which is integrally formed within a wall panel, or a structure wherein a member having a hook portion is retrogressively hooked on a wall panel is known.

In these conventional structures, the fixing of a member having a connecting portion is allowed only to a hole which is preliminarily formed in a wall panel, and it is very difficult for a user to install a coupling structure for a bar-like member in a desired portion of a panel such as a wall panel.

SUMMARY OF THE INVENTION

This invention has been accomplished under the circumstances as mentioned above and after a profound research. The main object of this invention is to provide a structure for coupling a bar-like member, which can be allowed to be set any desirable portion a panel such as a wall panel, and has a high reliability.

Above object has been achieved according to this invention by providing a structure wherein a member having a connecting portion is coupled to a holding member (or receiving member) which can be fixed to any desired portion of a panel such as a wall or floor panel. The panel as defined in this invention includes not only a panel, but also other panel-like surfaces such as wall or floor which is not in a form of a panel. In this structure, the connecting portion of the member is provided with a screw or a fixing means, and the holding member is so constructed to have a bearing hole which is also provided with a screw or a fixing means, each corresponding with the screw or the fixing means of the connecting portion and a base body to be fixed on a panel for disposing the bearing hole at a desired position of the panel. The connecting portion of the member is detachably coupled to the bearing hole of the holding member.

PREFERRED EMBODIMENT OF THE INVENTION

This invention will be further explained with reference to a preferred embodiment of this invention.

Figure 1:
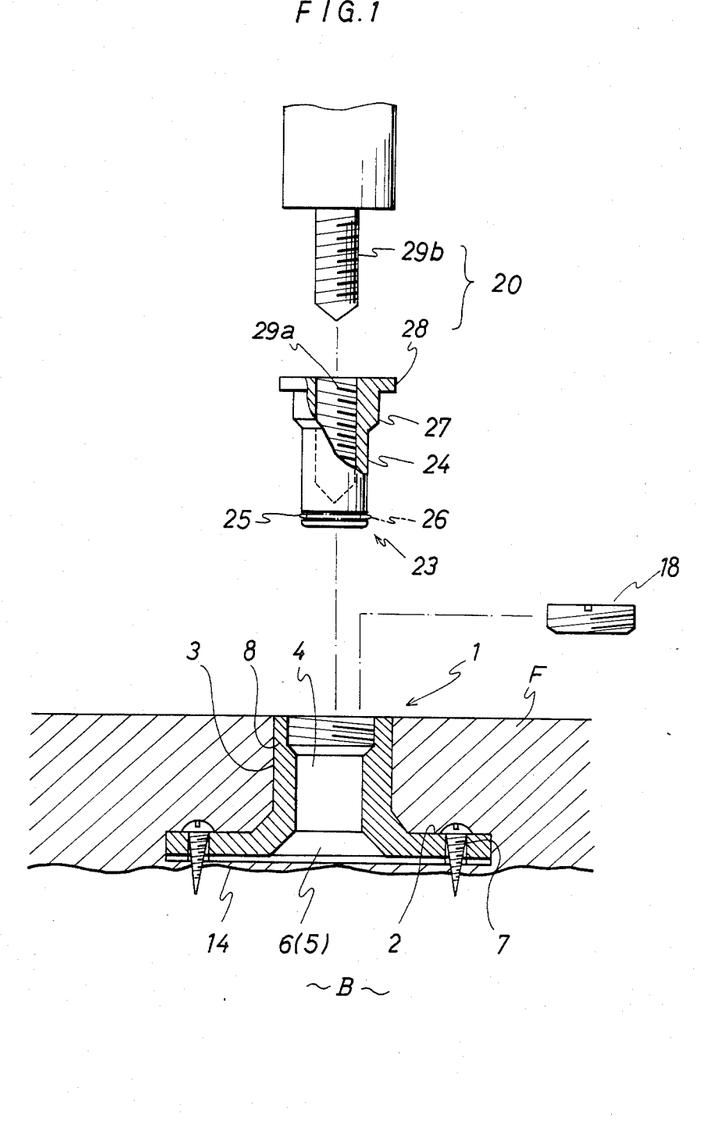
FIG. 1 is a sectional view showing an embodiment wherein a holding member of a coupling structure of this invention is installed on a floor.
Figure 2:
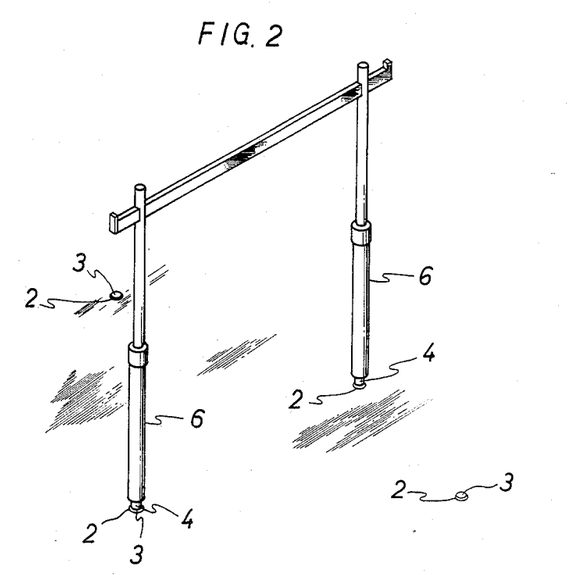
FIG. 2 is a perspective view showing an assembled display structure.

A coupling structure shown in FIGS. 1 and 2 is suited for setting on a floor (although it may be set on a wall), which is indicated as "B" as a fixing surface in FIG. 1.

In this embodiment, a holding member 1 comprises an annular base body 2, a cylindrical main body 3 erected from the base body 2, and a bearing hole 4 formed in the main body 3.

This bearing hole 4 is provided with a screw or a fixing means 5 for allowing a connecting portion 20 to be fixed in the bearing hole 4. In the embodiment shown in this drawing, one example of fixing means is indicated, wherein the lower portion of the bearing hole 4 is gradually and concentrically enlarged to form an enlarged opening 6.

The connecting portion 20 has in its lower end an engaging means 23 to be engaged with the enlarged opening 6. This engaging means 23 comprises an annular groove 25 formed in the inserting portion of the axis 24 of the connecting portion 20, and a snap ring 26 made of an open circular spring which is free to contract or expand and fitted in the annular groove 25.

Accordingly, when the connecting portion 20 is inserted in the bearing hole 4, the snap ring is contracted to have the same or smaller diameter as or than that of the outer circumference of the connecting portion 20, and when the lower end of the connecting portion 20 is reached to the enlarged opening 6, the snap ring 26 is enlarged to have a larger diameter than that of the outer circumference of the connecting portion 20 so as to fix the connecting portion 20 in the bearing hole 4.

The fixing means 23 may take any other construction as long as it is capable of performing a one-touch coupling or removal of the connecting portion 20, such for example as that of plug of microphone or ear-phone. Otherwise, the fixing means 23 may be a screw to be engaged with that of the bearing hole 4.

The holding member 1 is fastened on a panel "B" (for example, a foundation).

Thus, a plurality of holes 7 are provided in the base body 2 of the holding member 1 at an interval of equidistance along the circumference of the base body 2.

Generally a bolt is inserted in the hole 7 to fasten the holding member 1 to the panel "B". However, when the surface of the panel "B" is rugged as shown in FIG. 1, the base body 2 of the holding member 1 should be suitably fastened to the panel "B" with bolts so as to keep the horizon of the base body 2.

In the case of an embodiment shown in FIG. 1, the top of the holding member 1 (the opening surface of the bearing hole 4 is made flush with the floor surface "F" by coating the surfcae of the panel "B" with a floor-forming material such as mortar.

In this coating step, the floor-forming material may intrude from the enlarged opening 6 into the bearing hole 4 if the enlarged opening 6 is not closed.

Accordingly, it is preferred in order to prevent such an intrusion of the floor-forming material to cover the enlarged opening 6 with a plate 14.

The bearing hole 4 formed in the holding member 3 has a circular cross-section and an enlarged concentrical hole portion in its upper portion, thereby forming a tapered portion 8 at its boundary with the neighboring hole.

In conformity with such a construction of the holding member 3, an enlarged cylindrical portion 27 is formed at the proximal end portion (or upper portion) of the connecting portion 20 so as to be fitted in the enlarged concentrical hole portion as well as the tapered portion 8 of the holding member 3.

Accordingly, when the connecting portion 20 is inserted into the bearing hole 4, the enlarged cylindrical portion 27 could be fitted into the enlarged concentrical hole portion without leaving any dead space, thereby realizing a strong and secure fixing of any member which is provided with the connecting portion 20.

In order to guide the insertion of the connecting portion 20 to the bearing hole 4, a concentrically enlarged brim 28 may be provided on the top of the enlarged cylindrical portion 27. The inner wall of the enlarged concentrical hole may be provided wth threads for allowing the upper opening of the bearing hole 4 to be detachably sealed by an engagement with a cap 18.

When the cap 18 is fitted in the opening of the bearing hole 4 in this manner, water or dust on the floor "F" (when, as in this embodiment, the holding member is disposed in the floor "F") may be prevented from entering into the bearing hole 4.

When the holding member 1 is installed on the floor "F" as in this embodiment, any suitable coupling member having a connecting portion 20 such as a leg member 30 of a hanger frame for goods such as clothes may be fixed to the holding member 1 as shown in FIG. 2.

When the leg member 30 is provided with a connecting portion 20 on its lower end portion, the leg member 30 may be installed any desired location of a floor by distributing a plurality of holding members at any desired intervals on the floor. By laying a horizontal bar 31 between a pair of legs 30, a hanger frame can be easily assembled.

Various kinds of structure can be assembled in this mahner for various purposes. The connecting portion 20 may be constructed in separate to the coupling member (main body) so as to be detachable from the coupling member. In this case, a hole 29a provided with threads formed in the end portion of the connecting portion that is opposite to the lower end provided with a fixing means 23, while a threaded projection 29b to be engaged with the hole 29a is formed at the lower end of the coupling member.

If the projection 29b of various coupling member is formed to have the same diameter as that of the inner diameter of the hole 29a of the connecting portion 20, the coupling member can be fitted in the bearing hole 4 of various inner diameter by only exchanging the connecting portion 20 provided with the hole 29a with another one of a different outer diameter which conforms to the bearing hole 4.

Even if the outer diameter of the connecting portion is the same as that of the inner diameter of the bearing hole 4, the structure of the fixing means 23 may not be necessarily the same as that of the bearing hole 4.

In such a case, a connecting portion having a shape corresponding to that of the bearing hole 4 should be selected.

Figure 3:
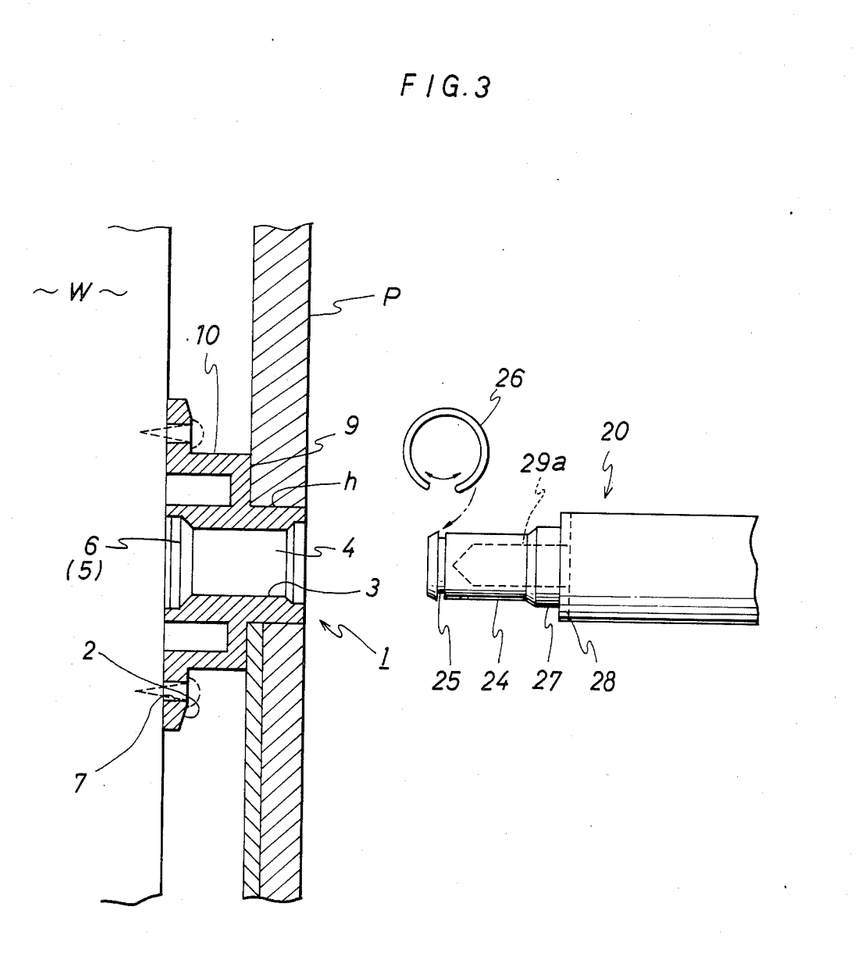
FIG. 3 shows an embodiment of this invention, wherein a holding member of the coupling structure is installed on a wall, and the holding member is provided with a stopper surface.
Figure 4:
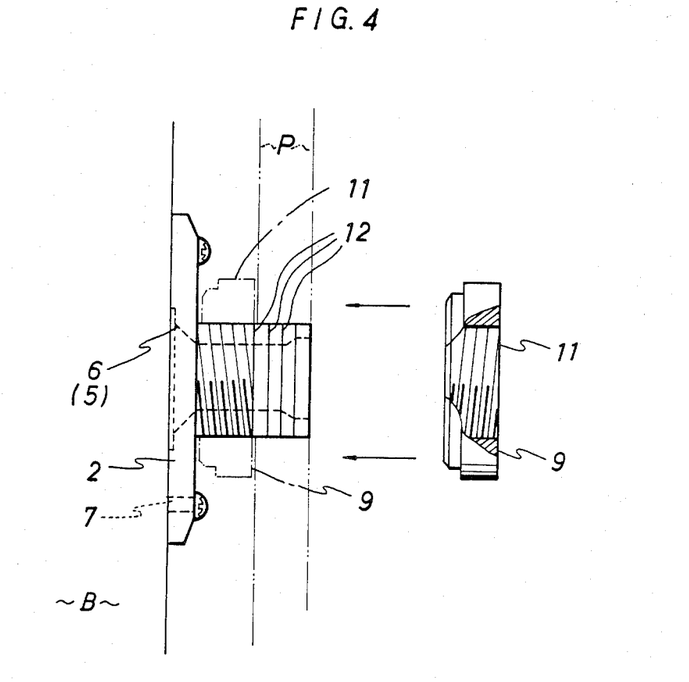
FIG. 4 shows a side view of another embodiment of this invention, wherein a stopper is movably attached to the holding member.

Another embodiment of the coupling structure shown in FIGS. 3 and 4 is mainly employed to set it on a wall panel (though it may be set on a floor).

The holding member 1 comprises in this embodiment an annular base body 2, a main body 3 erected perpendicularly from the base body 2, a stopper surface 9 formed at the intermediate portion of the main body 3, and a bearing hole 4 formed in the main body.

The fixing structures of the bearing hole 4 and the connecting portion 20 are the same as in the previous embodiment, so that the explanation thereof is omitted and instead the same part as that of the previous embodiment is indicated by the same reference numeral as employed in the previous embodiment.

Figure 8:
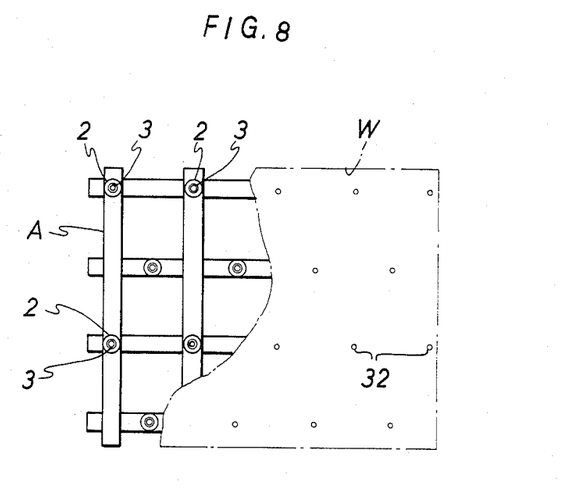
FIG. 8 is a plain view of the coupling structure shown in FIG. 4 or FIG. 5, which is partially cut out.

In this embodiment, the opening of the holding member 3 is fitted in an opening "h" provided in various portions of the wall panel "P", and the outer surface of the wall panel "P" is disposed in flush with the opening of the main body 3 (refer to FIG. 8).

This embodiment is featured in providing a locating means to the main body 3 for suitably positioning the wall panel "P". Thus, the stopper surface 9 is provided at an intermediate portion of the main body 3 of the holding member 1, leaving a space corresponding to the thickness of the wall panel "P" between the open end of the main body 3 and the stopper surface 9.

Accordingly, the stopper surface 9 is contacted with the back surface of the wall panel "P", when it is fixed in place.

In the embodiment shown in FIG. 3, the stopper surface 9 is extended perpendicularly from a middle portion of the wall of the main body 3 thereby to form an annular step as well as to constitute a front surface of a cylindrical base body 10 of a larger diameter which is integrally formed with the base body 2. The extending angle of the stopper surface may not be in perpendicular to the bearing hole 4, but may be inclined at any angle so as to set the wall panel in an inclined manner as desired.

Since the stopper surface 9 is integrally fixed to the holding member 1, the thickness of the wall panel "P" may be required to be adjusted when the thickness of the wall panel differs from the space which is preliminarily set by the stopper surface 9. However, if the stopper surface 9 is provided free to move along the main body 3, the adjustment of the thickness of wall panel "P" is no more required.

FIG. 4 shows another embodiment wherein the main body 3 of the holding member 1 is provided on its outer wall with threads, and an adjustment ring 11 is engaged therewith, so that it is possible to adjust the position of a stopper surface 9 by shifting the position of the ring 11. In this case, when a scale 12 is described on the main body 3 as shown in FIG. 4, an accurate adjustment of the stopper surface 9 can be carried out. Thus, by moving the adjustment ring 11 back and forth to a desired line of the scale 12, a wall panel of a different thickness or of a curved surface can be accurately positioned. The structure of the connecting portion 20 is the same in this embodiment as the previous embodiment, so that the explanation thereof is omitted and instead the same part as that of the previous embodiment is indicated by the same reference numeral as employed in the previous embodiment.

A display hook or an arm for supporting a display ledge may be applied as a coupling member having a connecting portion 20. By suitably selecting the bearing hole 4 of the main body 3 inserted in one of the holes "h" distributed in the wall panel, the hook or arm 32 as mentioned above can be fixed on the wall panel (FIG. 8).

Figure 5:
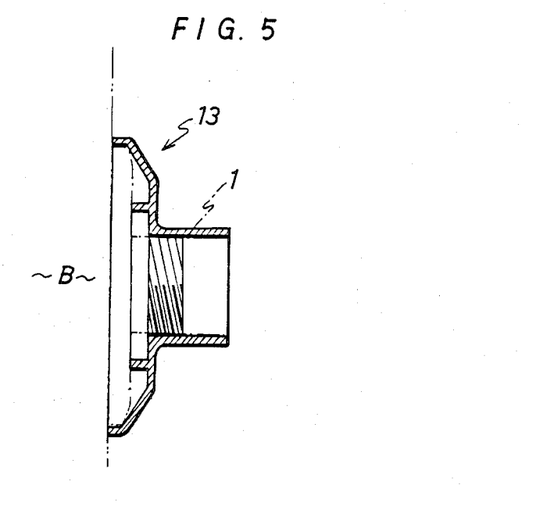
FIG. 5 shows a sectional view of a covering member which mounted over the holding member shown in FIG. 4.

This holding member 1 may not necessarily be employed in combination with the wall panel "P". For example, as shown in FIG. 5, in place of the adjustment ring 11, a covering body 13 having threads which can be engaged with the threads of the main body 3 of the holding member may be attached to the holding member 1 merely fixed on a wall to cover the whole external surface of the holding member 1 to protect the holding member 1 and to improve the external appearance.

The holding member 1 can be fixed on a panel and the like by any known methods, such for example as fastening with bolts, an adhesive and etc. When the holding member 1 is desired to be fixed on a glass panel, a method as shown in FIG. 6 may be adapted.

Figure 6:
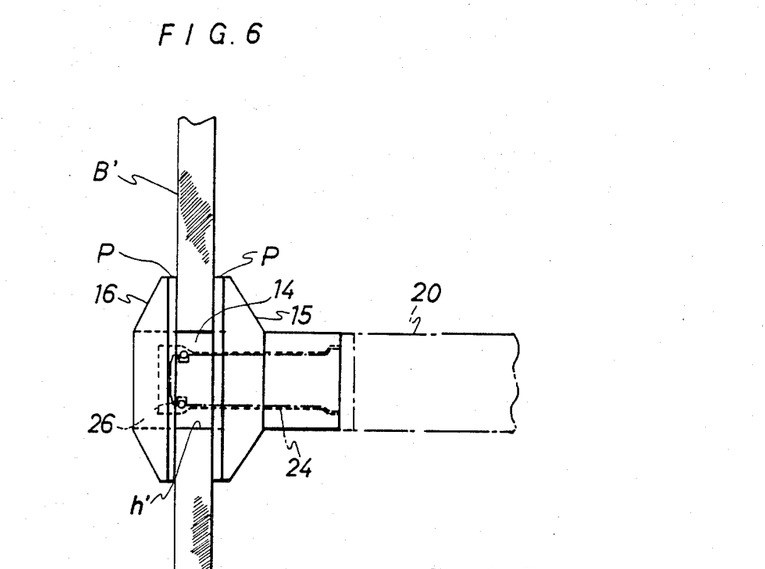
FIGS. 6 and 7 show embodiments wherein the holding member is fixed to a glass panel.

In FIG. 6, the base body 2 of holding member 1 is shown to comprise a shaft 14, and a pair of brim-like holders 15, 16 disposed separately on the shaft 14. At least one of the holders 15 and 16 (in this embodiment left side holder 16) is detachably engaged to the shaft 14.

When a glass plae, a mirror plate and the like which is not suited for fastening the holder member with bolts are employed as a panel "B'" to be attached with a holding member, a circular hole "h'" is perforated in the plate "B'".

After removing the holder 16 from the holding member 1, the shaft 14 is inserted into the hole "h'", and then the holder 16 is attached to the shaft 14.

It is preferable to interpose a packing "P" made of rubber and the like between the plate "B'" and each of the holder 15 and 16 in order to prevent the glass or mirror plate from being damaged at the time of fastening the holder 16 or when a load is given to the holding member through the connecting portion 20.

Figure 7:
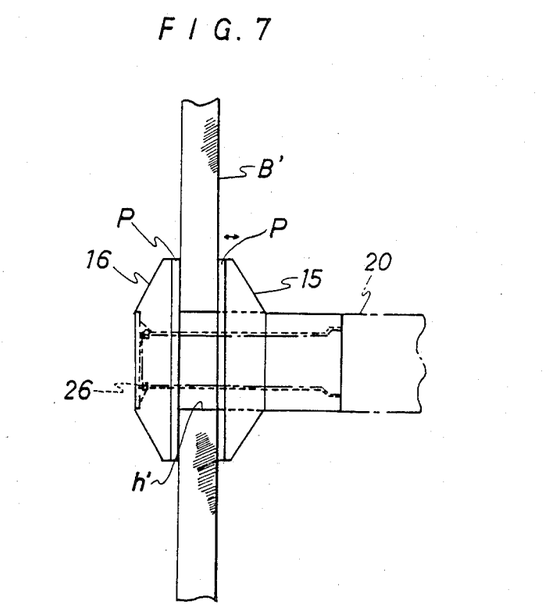

The coupling structure of the holding member may be modified to that shown in FIG. 7, wherein the other holder 15 is attached free to move back and forth.

It is also possible to employ a sucking base body 2, and to hermetically attach the sucking base body 2 onto the plate "B'", without perforating the circular hole "h'" in the plate "B'".

Figure 9:
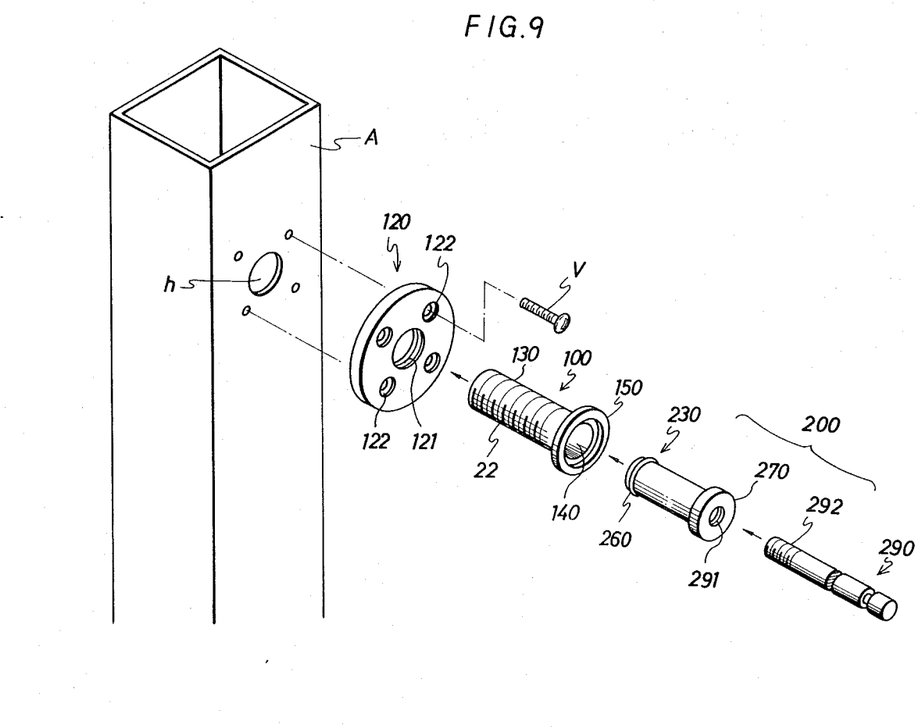
FIG. 9 is a perspective view showing a disintegrated aspect of a holding member according to a preferred embodiment of this invention.
Figure 10:
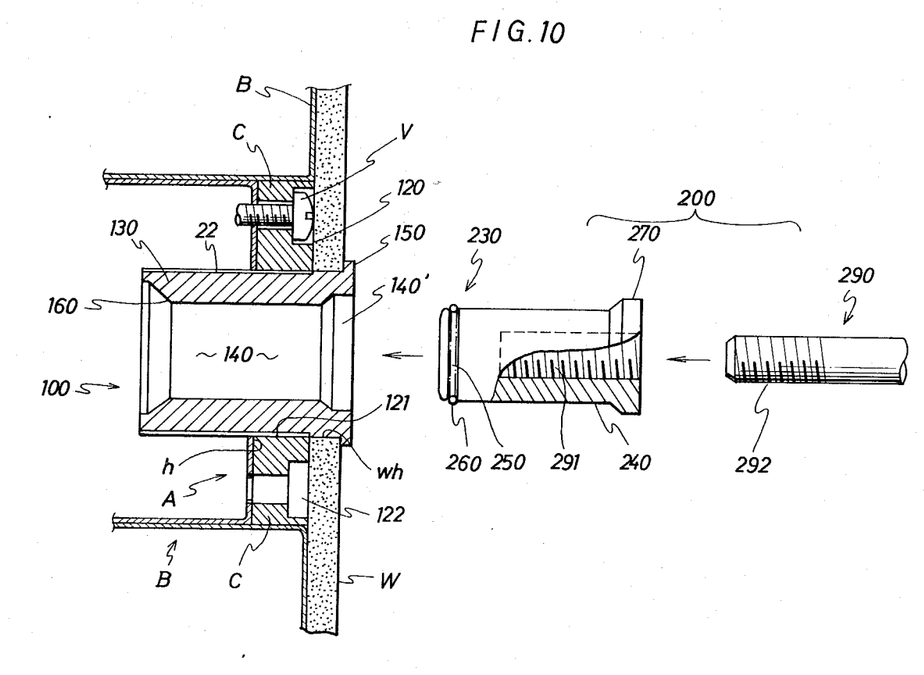
FIG. 10 is a sectional view of a holding member being assembled.

A coupling structure shown in FIGS. 9 and 10 comprises a base body 120, and a main body 100 to be attached with a connecting member 200.

To be more specific, the base body 120 is formed of an annular plate and has at its center a threaded aperture 121 and a plurality of fixing holes 122 provided along the circumference of is central hole.

The main body 100 has in its axis an axial hole 140 passing therethrough, and a shaft portion 130 at its fixing side. The outer surface of the shaft portion 130 has formed thereon threads 132 which can be engaged with the threads 121 formed in the base body 120.

The main body 100 also includes at its proximal end neighboring to the shaft portion 130 an enlarged sleeve-like fixing portion 150.

This axial hole 140 also includes an enlarged opening 160 having the same shape as that shown in FIG. 1 for allowing an engagement with the connecting member 200.

The connecting member 200 is provided with a coupling means 230 which is fitted in the enlarged opening 160.

The construction of the connecting member 200 is further explained below. The connecting member 200 in the same manner as in FIG. 1 comprises an axis 240, a concentrically enlarged brim 270 and a hole 291 formed in the axial center of the axis 240.

The hole 291 is provided with a fixing means such as threads as shown in FIG. 10 and is inserted by a projection 300 having a suitable fixing means such as a threads.

The coupling means 230 is also constructed in the same manner as in that shown in FIG. 1, and comprises an annular groove 250 and a snap ring 260. The coupling means 230 is fixed in the axial hole 140 in the same manner as explained with reference to FIG. 1.

The base body 120 can be fixed on a fixing surface "A" with a screw. This fixing surface "A" may be a wall panel as explained in this embodiment, a mirror panel and the like, a floor panel or a glass panel.

The fixing surface "A" in this embodiment is a frame having a square cross section and has an opening "h" corresponding to a threaded aperture 121 of the base body 120, and allowing to pass therethrough the shaft portion 130 of the main body 100.

A pair of another frames "B" are attached to the fixing surface "A", thereby forming a space "C" partially encircled by the fixing surface "A" and the frames B, into which the base body 120 is fitted (FIG. 10).

The size of the space "C" is preliminarily set to comform with the thickness of the base body 120.

Thus, the base body 120 is first fitted into the space "C", and then fixed in place on the surface "A" with a male screw "V", thereby keeping the surface of the base body 120 in flush with the surfaces of the frames "B".

On the surfaces of the frames B and the base body 120 is disposed a finishing panel such as wall panel "W" by a suitable means.

This wall panel "W" is perforated with an through opening "wh" for allowing the insertion of the shaft portion 130 of the main body 100.

After the attachment of the wall panel "W" is finished, the shaft portion 130 of the main body 100 is inserted into the threaded aperture 121 through the engagement of its threads 132 with the threaded aperture 121, until a flange portion 150 which is provided at the proximal end of the main body 100 is contacted to the surface of the wall panel "W".

The depth of insertion of the main body 100 (a distance between the flange portion 150 and the base body 120) can be adjusted in conformity to the thickness of the wall panel "W".

Since the main body 100 is adjustably inserted into the opening "h" of the fixing surface "A" so as to restrict projection outward of the main body 100 only to a height corresponding to the thick of the wall panel "W", the wall panel "W" can be intimately contacted with the fixing surface "A" through the base body 120 without leaving a dead space.

Accordingly, it is possible to install the wall panel "W" to maximize the effective space of a room, and to minimize the distortion or exhaustion of the wall panel "W". A plurality of the main body 100 of the holding member can be becomingly distributed in the wall panel "W" as desired.

The axis 240 of the connecting member 200 can be inserted into the axial hole 140 installed in a manner as mentioned above. In this case, when the axis 240 is inserted into the hole 140 to an extent that the fixing portion 280 provided at the lower end of the axis 240 reaches to the enlarged portion 140' of the main body 100, the connecting member 200 can be sucurely fixed in the main body 100 through an interaction between the enlarged opening and the coupling means 230 as explained in a previous embodiment shown in FIG. 1.

Into the hole 291 of the connecting member 200 is inserted parts 290 to be fixed therein.

The parts may be hanging rod for a display, or an arm for supporting a display ledge, and is provided at the lower end with threads 292 to be engaged with the hole 291, thereby to securely fix the parts.

Figure 11:
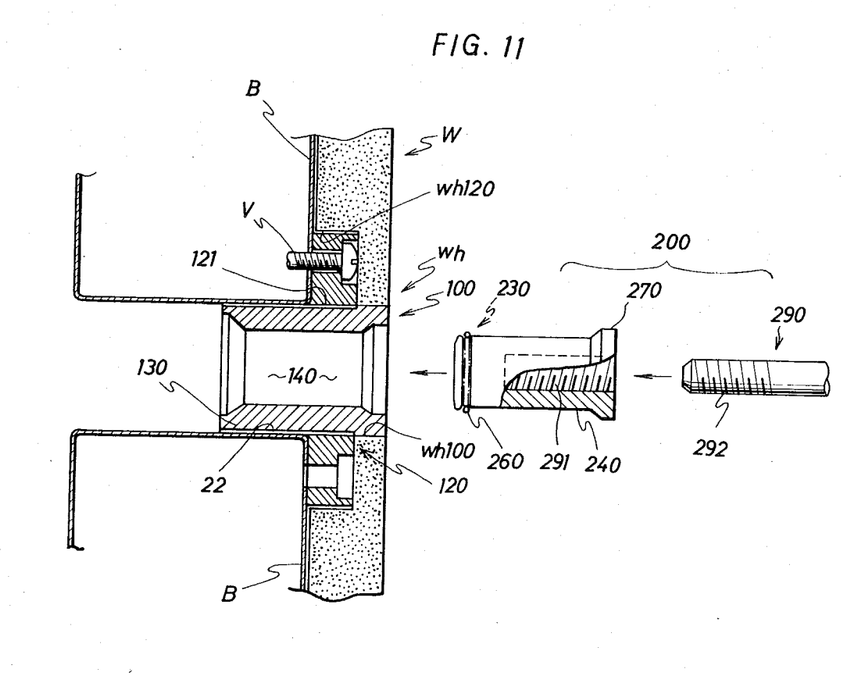
FIG. 11 is a sectional view of an assembled holding member according to another embodiment of this invention.

In an embodiment shown in FIG. 11 a base body 120 is extended over a pair of the frames B disposed separatedly from each other and is fixed thereon with a male screw "V", and a wall panel "W" is attached on the frames B.

In this embodiment, a through hole "wh" perforated in the wall panel "W" comprises an enlarged hole portion "wh1" to be fitted therein with the base body 120, and a small hole "wh2" to be inserted therethrough with a shaft portion 130 of the main body 100.

Accordingly, the wall panel "W" covers the entire front surface of the base body 120 except the threaded aperture 121.

After the wall panel "W" is attached, the screw portion 132 of the shaft 130 is inserted through the small hole "wh2" into the threaded aperture 121 of the base body 120 to be engaged each other.

The main body 100 in this embodiment differs from the previous embodiment only in that the shaft 130 is dispensed with the flange portion 150 in this embodiment. Other construction of the shaft 130 is the same as that of the previous embodiment so that explanation thereof is omitted by putting the same reference numerals to the same portions as those of the previous embodiment.

The external end of the shaft 130 of the main body 100 is adjusted to become in flush with the front surface of the wall panel by adjusting the insertion degree of the shaft 130 into the threaded aperture 121.

After this adjustment is performed, the connecting member 200 is inserted into the hole 140 of the main body 100, and then parts 290 is inserted into the hole 291 of the connecting member 200.

In this invention, a single or a plurality of holding members may be employed for utilizing them as a display assembly or a hanger in a shop or as daily necessities at home. It is also possible to utilize the holding member as a supporting pole for flags or marks and the like.

Materials to be utilized for the holding member may be a metal, a synthetic resin and the like as long as it has a sufficient strength to sustain a coupling member.

What is claimed is:

1. A coupling structure comprising:
    a holding member having a base body adapted to be fastened to a fixing surface, a cylindrical, externally threaded main body extending perpendicularly from said base body, a bearing hole extending into said main body from the end remote from said base body with an enlarged opening formed at the lower end of the bearing hole for fixing a connecting portion inserted into said bearing hole;
    an internally threaded adjustable ring rotatable about said main body for providing an adjustable stop surface; and
    a coupling member having a connecting portion extending into said bearing hole, engaging means having an annular groove formed in the inserting portion thereof, and a contractible snap ring placed in said annular groove and made of an opened circular spring, so that when the connecting portion is inserted into the bearing hole, the snap ring is contracted to have the same or smaller diameter as that of the outer circumference of the connecting portion, and when the lower end of the connection portion reaches the enlarged opening, the snap ring is enlarged to have a larger diameter than that of the outer circumference of the connecting portion so as to be fixed in the enlarged opening so that said members are removably coupled together.

2. A structure according to claim 1, wherein the base body of the holding member has a shape of an annular plate, and is provided with holes along a periphery thereof for inserting fastening means to fix the base body on the fixing surface.

3. A structure according to claim 1, wherein at least a portion of the bearing hole near the open end is provided with threads, and the open end is capable of being sealed with a disc-like cap having on its circumference threads corresponding to the first mentioned threads.

4. A structure according to claim 1, wherein a covering body for covering the holding member is detachably engaged with threads provided on the external wall of the main body.

5. A structure according to claim 1, wherein the bearing hole comprises near the opening thereof a concentrical hole of an enlarged inner diameter having a tapered inner wall, and the connecting portion comprises an enlarged portion which coforms to the hole of the enlarged inner diameter formed in the bearing hole.

* * * * *